(12) United States Patent
Lo

(10) Patent No.: US 9,596,812 B2
(45) Date of Patent: Mar. 21, 2017

(54) MULTI-FILTRATION AUTO-DRAINAGE/IRRIGATION PIPE AND PLANTING DEVICE

(71) Applicant: FUNNY PLANTING LIMITED, Hong Kong (CN)

(72) Inventor: Ping Yiu Lo, Hong Kong (CN)

(73) Assignee: Chao Liu, Shenzhen, Guangdong (CN)

( * ) Notice: Subject to any disclaimer, the term of this patent is extended or adjusted under 35 U.S.C. 154(b) by 81 days.

(21) Appl. No.: 14/425,152

(22) PCT Filed: Mar. 24, 2014

(86) PCT No.: PCT/CN2014/073987
§ 371 (c)(1),
(2) Date: Mar. 2, 2015

(87) PCT Pub. No.: WO2014/161437
PCT Pub. Date: Oct. 9, 2014

(65) Prior Publication Data
US 2015/0230416 A1   Aug. 20, 2015

(30) Foreign Application Priority Data
Apr. 2, 2013  (CN) .................. 2013 2 0160420 U

(51) Int. Cl.
*A01G 25/00* (2006.01)
*A01G 25/02* (2006.01)
(Continued)

(52) U.S. Cl.
CPC .............. *A01G 25/02* (2013.01); *A01G 9/02* (2013.01); *A01G 27/008* (2013.01); *B01D 35/02* (2013.01)

(58) Field of Classification Search
CPC .......... A01G 25/02; A01G 27/00; A01G 9/02; A01G 31/00; A01G 31/06
(Continued)

(56) References Cited

U.S. PATENT DOCUMENTS 2,851,306 A  *  9/1958  Huffaker ................ A01G 25/02
                                                    138/103
3,080,124 A  *  3/1963  Rathmann .............. A01G 25/02
                                                    239/450
(Continued)

FOREIGN PATENT DOCUMENTS

CH          658569 AS    * 11/1986  ............. A01G 25/06
CN   WO 2014198240 A1 * 12/2014  ............ E02B 11/005
(Continued)

*Primary Examiner* — Monica Williams
*Assistant Examiner* — Aaron Rodziwicz

(57) ABSTRACT

A multi-filtration auto-drainage/irrigation pipe includes a pipe body, which includes a first drainage and irrigation channel, a second drainage and irrigation channel, a third drainage and irrigation channel, a first drainage and irrigation port, a second drainage and irrigation port and a third drainage and irrigation port. The first drainage and irrigation port is a first filtering layer having first filtering holes uniformly distributed. The second drainage and irrigation port is a second filtering layer having second filtering holes uniformly distributed. The third drainage and irrigation port is a third filtering layer having third filtering holes uniformly distributed. The first drainage and irrigation port is arranged on a pipe wall of the pipe body. The second drainage and irrigation port is arranged between the second and the third drainage and irrigation channels. The third drainage and irrigation port is arranged between the second and the first drainage and irrigation channels.

13 Claims, 9 Drawing Sheets

(51) Int. Cl.
*B01D 35/02* (2006.01)
*A01G 9/02* (2006.01)
*A01G 27/00* (2006.01)

(58) Field of Classification Search
USPC .............................................. 47/79
See application file for complete search history.

(56) References Cited

U.S. PATENT DOCUMENTS

| | | | | |
|---|---|---|---|---|
| 3,797,754 A | * | 3/1974 | Spencer | A01G 25/02 137/217 |
| 4,061,272 A | * | 12/1977 | Winston | A01G 25/06 156/78 |
| 4,191,518 A | * | 3/1980 | Kojimoto | A01G 25/02 425/326.1 |
| 4,756,339 A | * | 7/1988 | Buluschek | A01G 25/02 138/103 |
| 4,904,112 A | * | 2/1990 | McDonald | A01G 25/06 405/36 |
| 5,106,235 A | * | 4/1992 | King | A01G 25/06 138/118 |
| 8,491,223 B2 | * | 7/2013 | Ohlin | A01G 25/06 239/44 |
| 2003/0201345 A1 | * | 10/2003 | Jeong | A01G 25/02 239/542 |
| 2008/0017729 A1 | * | 1/2008 | Ou-Young | A01G 25/02 239/145 |
| 2012/0273083 A1 | * | 11/2012 | Lin | F16L 11/20 138/140 |
| 2013/0272791 A1 | * | 10/2013 | Bayley | A01G 25/02 405/37 |

FOREIGN PATENT DOCUMENTS

| | | | | |
|---|---|---|---|---|
| DE | 2558957 A1 | * | 7/1976 | A01G 31/06 |
| JP | WO 2009060784 A1 | * | 5/2009 | A01G 25/06 |
| WO | WO 9824553 A1 | * | 6/1998 | A01G 25/02 |

* cited by examiner

MULTI-FILTRATION AUTO-DRAINAGE/IRRIGATION PIPE AND PLANTING DEVICE

CROSS REFERENCE OF RELATED APPLICATION

This is a U.S. National Stage under 35 U.S.C 371 of the International Application PCT/CN2014/073987, filed Mar. 24, 2014, which claims priority under 35 U.S.C. 119(a-d) to CN 201320160420.7, filed Apr. 2, 2013.

BACKGROUND OF THE PRESENT INVENTION

Field of Invention

The present invention relates to a multi-filtration auto-drainage/irrigation pipe and a planting device, which are applied in fields of mountains, soil slopes, retaining walls, grass ground slopes, airport runways, roads, football fields, tennis courts and main bodies of earth and rockfill dams, for roof greening, stereo planting, household workshops, desert greening cultivation, alkalis removing of subsurface pipes and sewage multi-filtration.

Description of Related Arts

Traditionally, a universally adopted drainage system of roads is to arrange drainage channels between road edge stones and roads, wherein each drainage channel is connected with a plurality of drainage wells; or to directly arrange the road edge stones on two sides of each road and arrange a drainage well having grids at regular intervals.

Although a series of closed structures for road extraneous water is designed, e.g. embedded curbstones, masonry road shoulders and wet masonry retaining walls, partially solving an erosion problem of the road extraneous water, a drainage problem for water penetrating into the roads is ignored. It is inevitable that the water penetrates into an asphalt surface or a cement concrete road surface in a rainy season. However, an interior drainage problem of road structure layers is often not considered when the roads are designed.

Additionally, no drainage measure is arranged yet on mountains, soil slopes, retaining walls, grass ground slopes, highways and central isolation belts and green belts arranged in the middle and two sides of the roads where the water needs to be drained.

Moreover, planting still adopts a traditional watering method which wastes resources of water and fertilizer and is liable to pollute the environment.

SUMMARY OF THE PRESENT INVENTION

An object of the present invention is to provide a multi-filtration auto-drainage/irrigation pipe and a planting device. The multi-filtration auto-drainage/irrigation pipe adopts a manner of triple filtration and an assembled structure, which effectively prevents the pipe from being blocked and facilitates machining, assembling and replacing. The multi-filtration auto-drainage/irrigation pipe of the present invention is able to solve an existing drainage and irrigation problem and increase a drainage and irrigation efficiency.

The multi-filtration auto-drainage/irrigation pipe of the present invention adopts the following technical solutions. The multi-filtration auto-drainage/irrigation pipe has both a drainage function and an irrigation function, comprising a pipe body, wherein:

a first drainage and irrigation channel, a second drainage and irrigation channel, a third drainage and irrigation channel, a first drainage and irrigation port, a second drainage and irrigation port and a third drainage and irrigation port are arranged in the pipe body;

the first drainage and irrigation port is a first filtering layer and a plurality of first filtering holes are uniformly distributed thereon;

the second drainage and irrigation port is a second filtering layer and a plurality of second filtering holes are uniformly distributed thereon;

the third drainage and irrigation port is a third filtering layer and a plurality of third filtering holes are uniformly distributed thereon;

the first drainage and irrigation port is arranged on a pipe wall of the pipe body;

the second drainage and irrigation port is arranged between the third drainage and irrigation channel and the second drainage and irrigation channel;

the third drainage and irrigation port is arranged between the second drainage and irrigation channel and the first drainage and irrigation channel;

when draining, water flows through the first filtering layer, the second filtering layer, the third filtering layer and the first drainage and irrigation channel, and then is discharged; and when irrigating, the water flows through the first drainage and irrigation channel, the third filtering layer, the second filtering layer and the first filtering layer, and then is discharged.

The multi-filtration auto-drainage/irrigation pipe of the present invention further adopts following technical solutions.

The third drainage and irrigation channel having a square section is arranged in the pipe body longitudinally along the pipe wall. A left lateral surface and a right lateral surface of the third drainage and irrigation channel are both closed surfaces. Above the third drainage and irrigation channel is the second drainage and irrigation port. Below the third drainage and irrigation channel is the first drainage and irrigation port. The two lateral surfaces of the third drainage and irrigation channel extend to connect to an inner wall of the pipe body for forming two extension surfaces, wherein the two extension surfaces are the third drainage and irrigation port. The first drainage and irrigation channel and the second drainage irrigation channel are respectively formed between two sides of the third drainage and irrigation port and the inner wall of the pipe body. The multi-filtration auto-drainage/irrigation pipe is assembled by three components:

the pipe body which is circular, wherein the pipe wall of the pipe body has an opening thereon and two vertical plates are respectively extended from two ends of the opening into the multi-filtration auto-drainage/irrigation pipe;

a trapezoidal groove, wherein the plurality of the second filtering holes and the plurality of the third filtering holes are respectively and uniformly distributed on three surfaces of the trapezoidal groove; and a bottom plate, wherein the plurality of the first filtering holes are uniformly distributed on the bottom plate.

The trapezoidal groove is assembled on the two vertical plates arranged in the pipe body. The bottom plate is assembled within the opening of the pipe wall of the pipe body. After being assembled, the bottom plate is the first drainage and irrigation port as the first filtering layer; a bottom surface of the three surfaces of the trapezoidal groove is the second drainage and irrigation port as the second filtering layer; two lateral slopes of the three surfaces of the trapezoidal groove are the third drainage and irrigation port as the third filtering layer; the third drainage and irrigation channel is formed between the bottom plate and the bottom surface of the trapezoidal groove; the second drainage and irrigation channel and the first drainage and irrigation channel are respectively formed between the two lateral slopes of the trapezoidal groove and the inner wall of the pipe body.

Each end of the opening of the pipe body has an arc groove; each top end of the vertical plates arranged in the pipe body has an arc flange; the inner wall of the pipe body has two arc flanges; each side of the bottom plate has an arc flange; each end of the bottom surface of the trapezoidal groove has an arc groove; and each top end of the two lateral slopes of the trapezoidal groove has an arc groove, wherein:

the bottom plate is plugged into the opening of the pipe body through the arc grooves and the arc flanges; and the vertical plates in the pipe body, the inner wall of the pipe body and the trapezoidal groove are plugged together through the arc flanges and the arc grooves.

A pore size of the first filtering holes is larger than a pore size of the second filtering holes; and the pore size of the second filtering holes is larger than a pore size of the third filtering holes.

The first, the second and the third filtering holes are bar-shaped, triangular, circular or square.

An upper part of the multi-filtration auto-drainage/irrigation pipe is arc-shaped and a lower part of the multi-filtration auto-drainage/irrigation pipe is square.

The bottom plate is arc-shaped or flat.

The multi-filtration auto-drainage/irrigation pipe is made of metals, plastic cement (polyvinyl chloride, PVC) or ceramic.

The planting device of the present invention adopts the following technical solutions. The planting device comprises:

a planting container;

a water supplying pipe arranged in the planting container, wherein a water level mark is on the water supplying pipe;

the multi-filtration auto-drainage/irrigation pipe vertically connected with the water supplying pipe; and a floating water level indicator arranged in the water supplying pipe.

The planting device further adopts the following technical solutions.

The water supplying pipe has a plurality of sections which are plugged together. One or more layers of the multi-filtration auto-drainage/irrigation pipes are arranged on the water supplying pipe. Each layer has one or two multi-filtration auto/drainage/irrigation pipes. A pipe joint for plugging is arranged between each multi-filtration auto-drainage/irrigation pipe and a coupling end of the water supplying pipe. The multi-filtration auto-drainage/irrigation pipe is able to be extended by connecting one more multi-filtration auto-drainage/irrigation pipe through a joint or an elbow. Rubber sealing rings are arranged where each two sections of the water supplying pipe are connected, where each multi-filtration auto-drainage/irrigation pipe and the water supplying pipe are connected and where each two multi-filtration auto-drainage/irrigation pipes are connected.

The water supplying pipe further comprises a conjoined attached pipe which is intercommunicated with the water supplying pipe. A straw device is arranged in the conjoined attached pipe. The straw device comprises a straw, wherein a top end of the straw is connected with a water pumping device or a negative pressure balloon.

The present invention has following benefits. Firstly, the multi-filtration auto-drainage/irrigation pipe effectively solves an interior drainage problem of structure layers of mountains, soil slopes, roads and protection slopes; and the multi-filtration auto-drainage/irrigation pipe is easy to use and has a low cost and a good effect. Secondly, the planting device is suitable for different planting containers of different shapes and different sizes; the planting device saves water and fertilizer, and improves a growing environment of plant roots; and the planting device is clean and is easy to use. Thirdly, the present invention is applied for roof greening, stereo planting, household workshops and desert greening cultivation. Fourthly, the present invention is applied for alkalis removing of subsurface pipes. Fifthly, a multi-filtration auto-drainage/irrigation pipe and a planting device, for sewage multi-filtration, are provided in the present invention.

These and other objectives, features, and advantages of the present invention will become apparent from the following detailed description, the accompanying drawings, and the appended claims.

Figure 1:
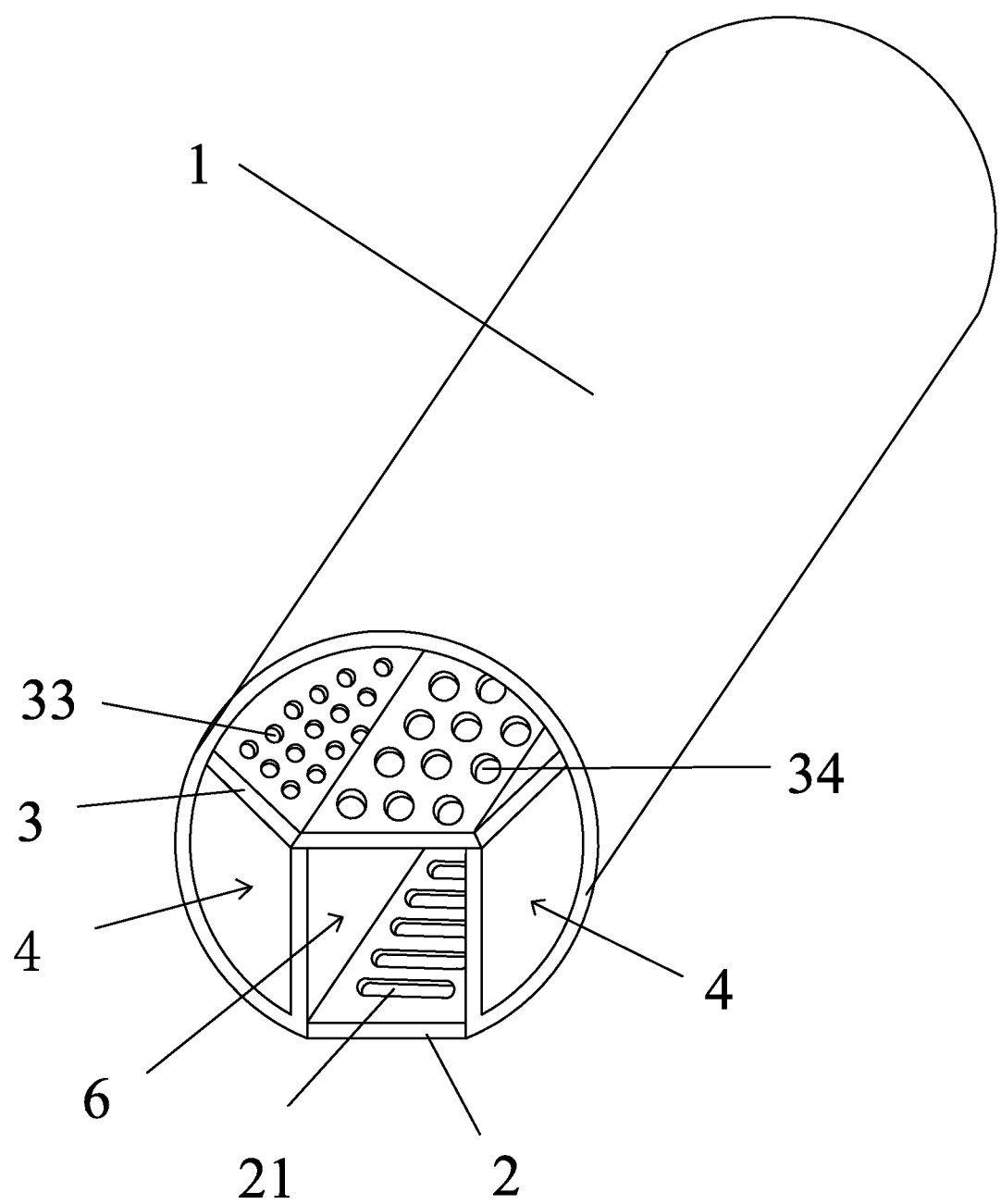
FIG. 1 is a sketch view of a multi-filtration auto-drainage/irrigation pipe according to preferred embodiments of the present invention.
Figure 2:
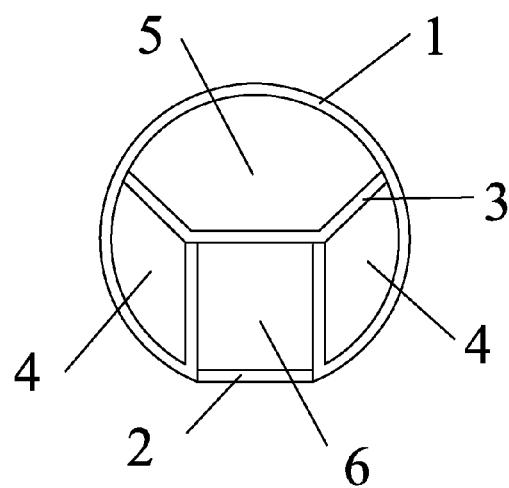
FIG. 2 is a cross sectional view of the multi-filtration auto-drainage/irrigation pipe according to the preferred embodiments of the present invention, wherein a bottom plate is flat.
Figure 3:
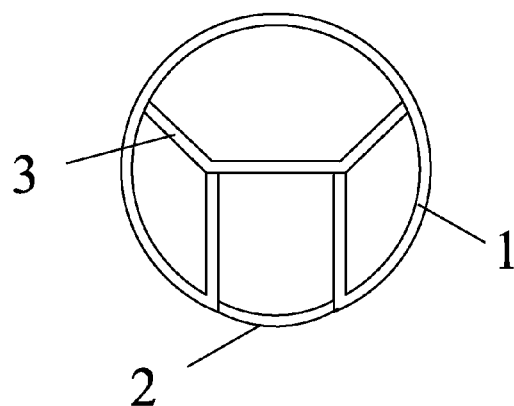
FIG. 3 is a cross sectional view of a first alternative mode of the multi-filtration auto-drainage/irrigation pipe according to the preferred embodiments of the present invention, wherein the bottom plate is arc-shaped.
Figure 4:
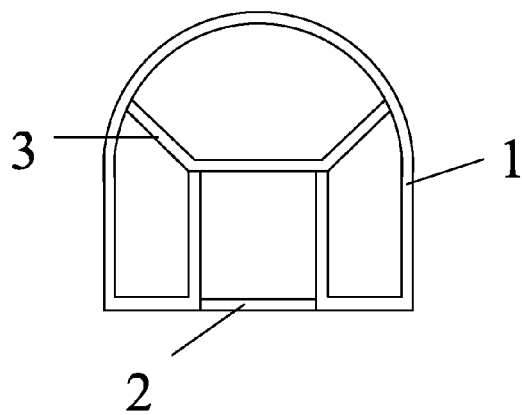
FIG. 4 is a cross sectional view of a second alternative mode of the multi-filtration auto-drainage/irrigation pipe according to the preferred embodiments of the present invention, wherein an upper part is arc-shaped and a lower part is square.
Figure 5:
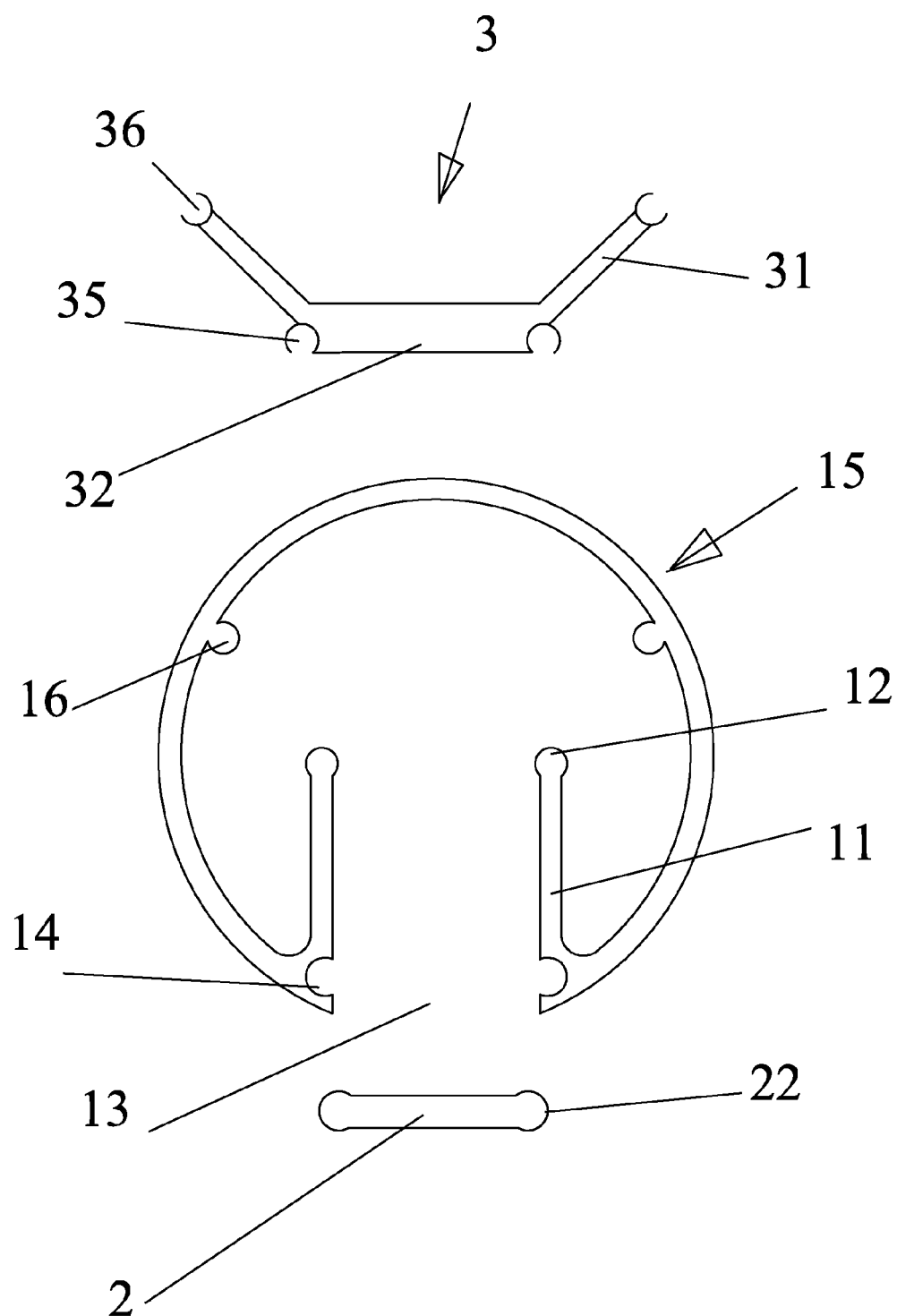
FIG. 5 is an exploded view of FIG. 2 according to the preferred embodiments of the present invention.
Figure 6:
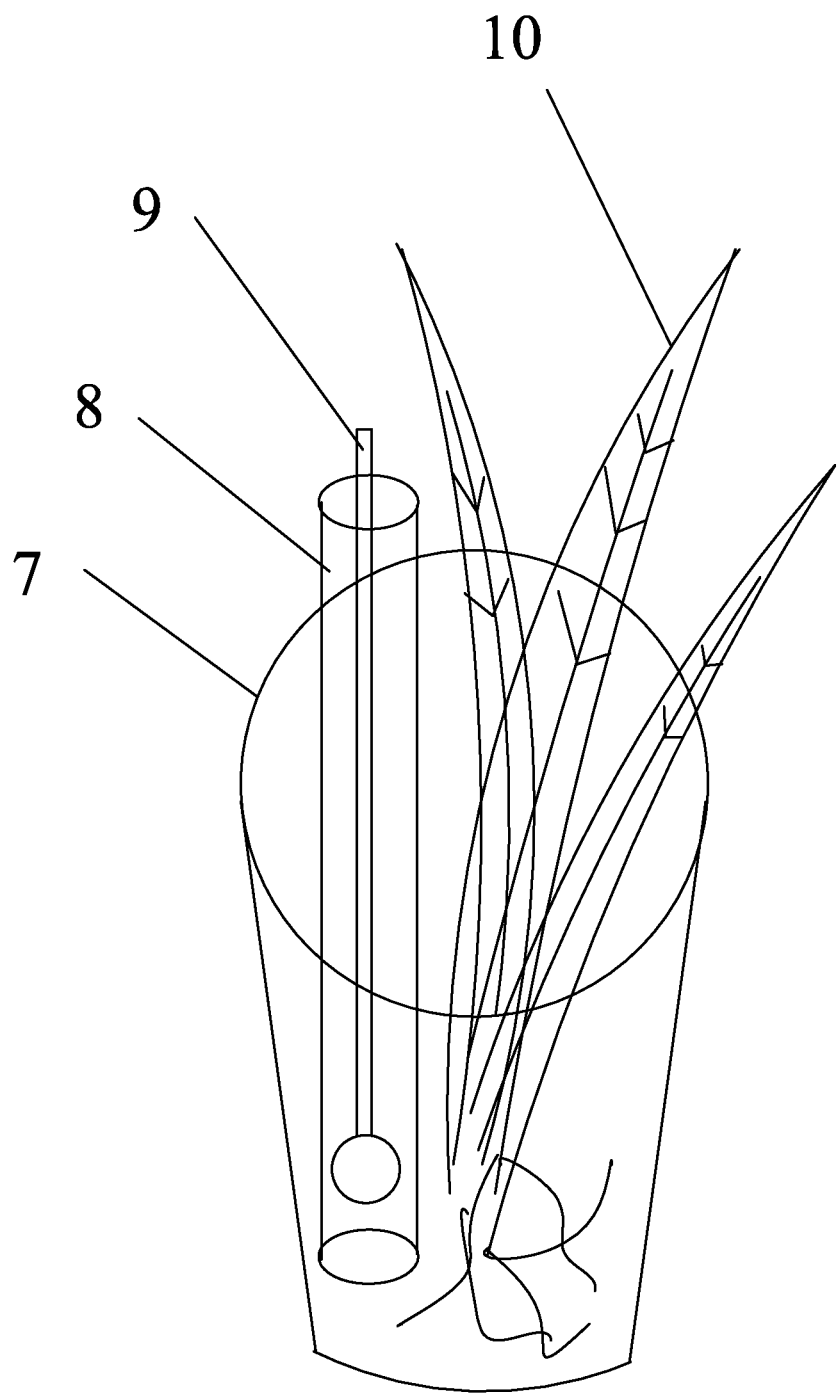
FIG. 6 is a sketch view of a planting device according to the preferred embodiments of the present invention.
Figure 8:
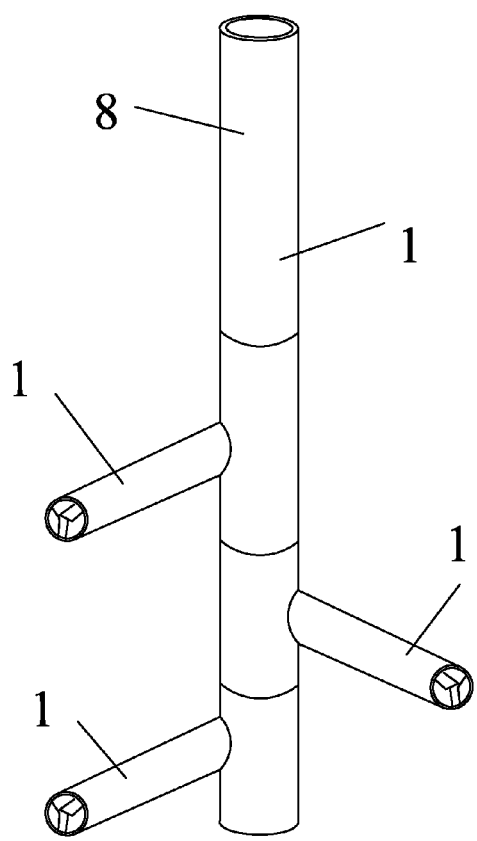
FIG. 8 is a sketch view of an alternative combination of the water supplying pipe of FIG. 6 and the multi-filtration auto-drainage/irrigation pipe according to the preferred embodiments of the present invention.
Figure 7:
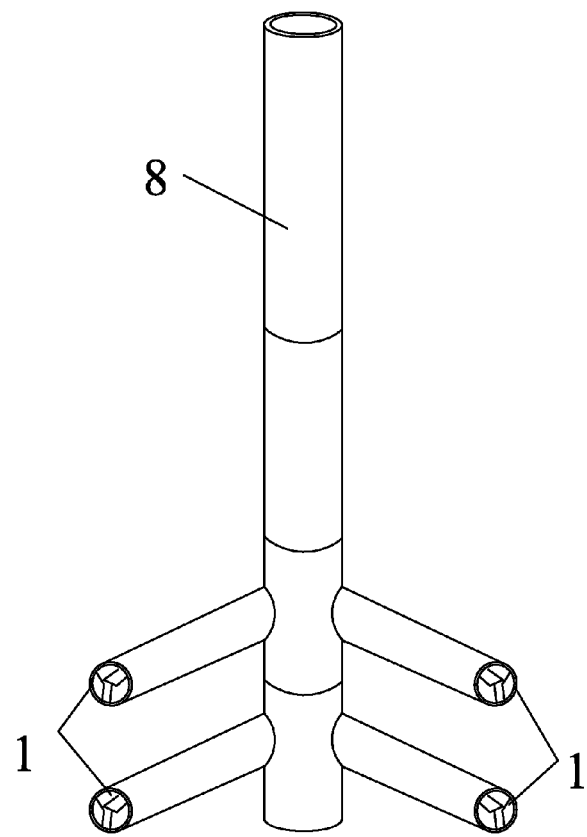
FIG. 7 is a sketch view of a combination of a water supplying pipe of FIG. 6 and the multi-filtration auto-drainage/irrigation pipe according to the preferred embodiments of the present invention.
Figure 9:
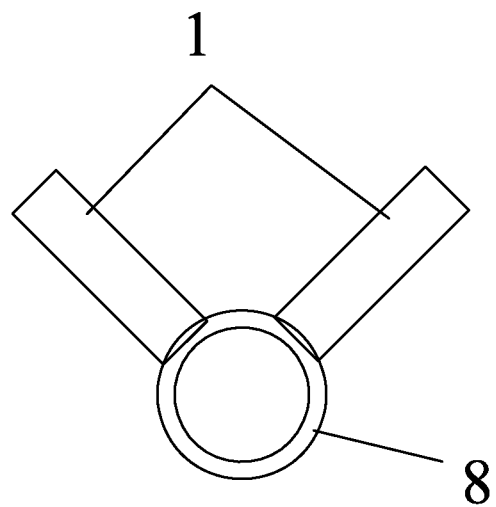
FIG. 9 is a top view of FIG. 7 and FIG. 8 according to the preferred embodiments of the present invention.
Figure 10:
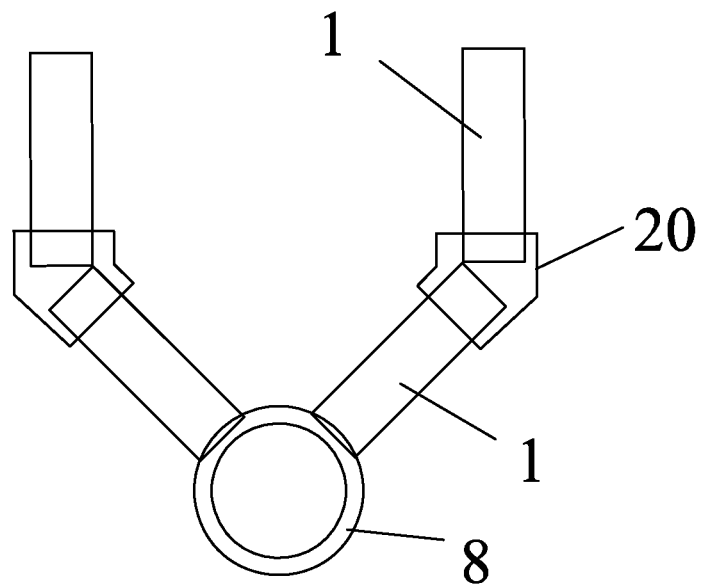
FIG. 10 is a sketch view of respective connections of the two multi-filtration auto-drainage/irrigation pipes of FIG. 9 according to the preferred embodiments of the present invention.
Figure 11:
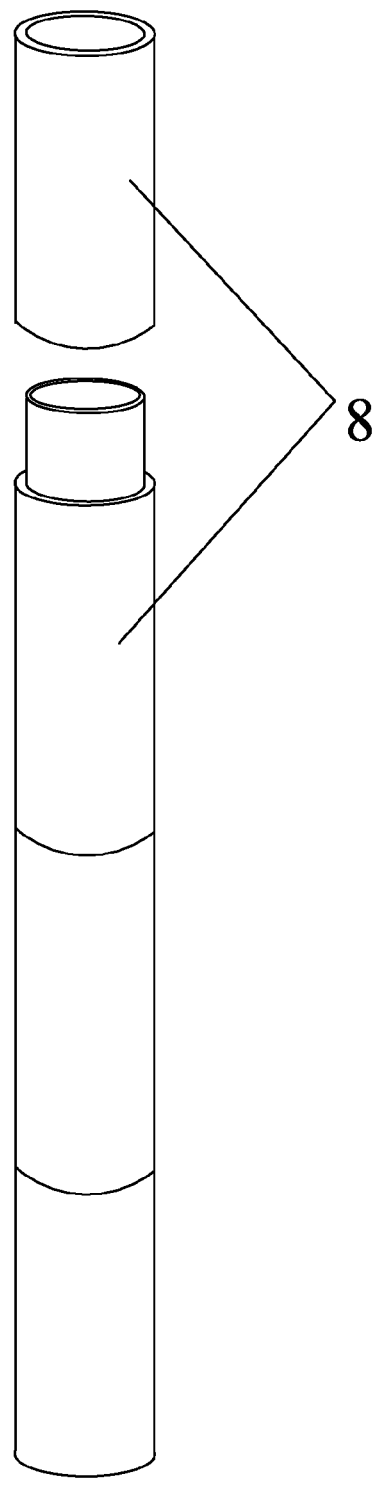
FIG. 11 is a sketch view of the water supplying pipe of FIG. 6 according to the preferred embodiments of the present invention.
Figure 12:
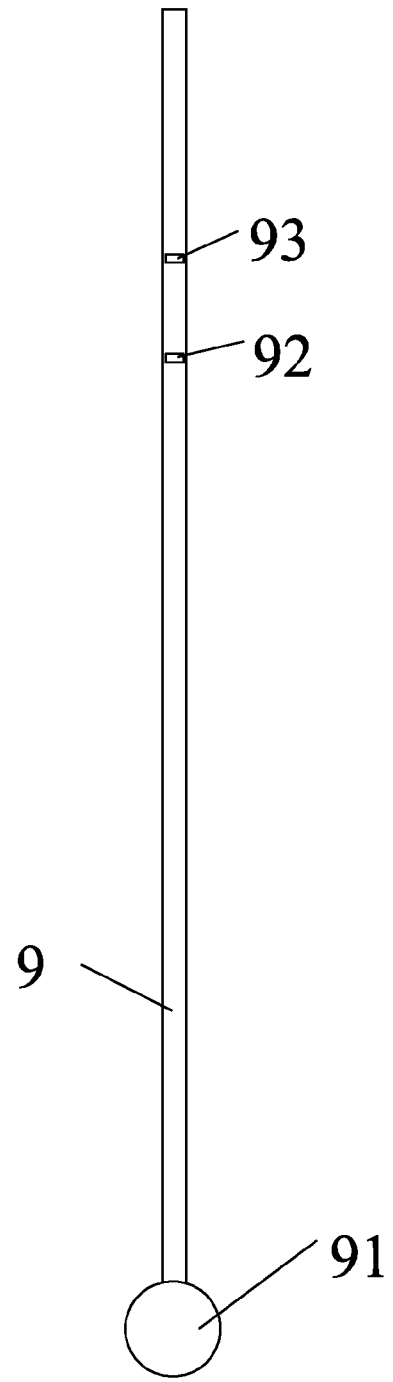
FIG. 12 is a sketch view of a floating water level indicator of FIG. 6 according to the preferred embodiments of the present invention.

In the drawing, 1: multi-filtration auto-drainage/irrigation pipe; 11: vertical plate; 12: arc flange of the vertical plate; 13: opening; 14 arc groove of the opening; 15: pipe body; 16: arc flange of a pipe wall; 2: first drainage and irrigation port (bottom plate); 21: first filtering hole; 22: arc flange of the bottom plate; 23: water pumping device; 24: straw; 3: trapezoidal groove component; 31: third drainage and irrigation port (two lateral slopes of the trapezoidal groove component); 32: second drainage and irrigation port (a bottom surface of the trapezoidal groove component); 33: third filtering hole; 34: second filtering hole; 35: arc groove of the bottom surface of the trapezoidal groove component; 36: arc groove of the two lateral slopes of the trapezoidal groove component; 4: first drainage and irrigation channel; 5: second drainage and irrigation channel; 6: third drainage and irrigation channel; 7: flowerpot; 8: water supplying pipe; 81: conjoined attached pipe; 9: floating water level indicator; 91: buoy; 92: lowest water level mark; 93: highest water level mark; 10: plant.

DETAILED DESCRIPTION OF THE PREFERRED EMBODIMENT

With accompanying drawings, the present invention is illustrated as follows.

A multi-filtration auto-drainage/irrigation pipe 1 has both a drainage function and an irrigation function. When irrigating, water enters drainage and irrigation channels and then flows out through filtering holes; when draining, excessive water is sucked into the drainage and irrigation channels through the filtering holes through a siphon principle, and then is discharged.

The multi-filtration auto-drainage/irrigation pipe 1 is applied for irrigation, and for drainage of mountains, soil slopes, retaining walls, grass ground slopes, airport runways and roads; the multi-filtration auto-drainage/irrigation pipe is also applied for the drainage of road surfaces of vehicular bridges, football fields and tennis courts; the multi-filtration auto-drainage/irrigation pipe is able to monitor an interior leakage of buildings; the multi-filtration auto-drainage/irrigation pipe is also a grout pressure-adding pipe; the multi-filtration auto-drainage/irrigation pipe is able to be arranged in a landfill or a reclamation area; the multi-filtration auto-drainage/irrigation pipe is also applied for the drainage of main bodies of earth and rockfill dams; the multi-filtration auto-drainage/irrigation pipe is able to be arranged at the bottom of a concrete dam; the multi-filtration auto-drainage/irrigation pipe is also applied for a farmland efficient water-saving irrigation system; the multi-filtration auto-drainage/irrigation pipe is also applied for a box irrigation system, roof greening, household workshops, desert greening cultivation, stereo planting, an improvement of a growing environment of plant roots, alkalis removing of subsurface pipes and sewage multi-filtration.

The multi-filtration auto-drainage/irrigation pipe 1 is embodied to be an overall stricture or an assembly structure by a plurality of components.

First Embodiment

Overall Structure

Referring to FIG. 1-4 of the drawings, the multi-filtration auto-drainage/irrigation pipe 1 comprises:

a first drainage and irrigation channel 4, a second drainage and irrigation channel 5, a third drainage and irrigation channel 6, a first drainage and irrigation port 2, a second drainage and irrigation port 32 and a third drainage and irrigation port 31, wherein:

the first drainage and irrigation port 2 is a first filtering layer and a plurality of first filtering holes 21 are uniformly distributed thereon;

the second drainage and irrigation port 32 is a second filtering layer and a plurality of second filtering holes 34 are uniformly distributed thereon;

the third drainage and irrigation port 31 is a third filtering layer and a plurality of third filtering holes 33 are uniformly distributed thereon;

the first drainage and irrigation port 2 is arranged on a pipe wall of a pipe body of the multi-filtration auto-drainage/irrigation pipe and is located at the bottom of the pipe body;

the second drainage and irrigation port 32 is arranged between the third drainage and irrigation channel 6 and the second drainage and irrigation channel 5;

the third drainage and irrigation port 31 is arranged between the second drainage and irrigation channel 5 and the first drainage and irrigation channel 4;

when draining, water flows through the first drainage and irrigation port 2 (the first filtering layer), the third drainage and irrigation channel 6, the second drainage and irrigation port 32 (the second filtering layer), the second drainage and irrigation channel 5, the third drainage and irrigation port 31 (the third filtering layer) and the first drainage and irrigation channel 4, and then is discharged;

when irrigating, the water flows through the first drainage and irrigation channel 4, the third drainage and irrigation port 31 (the third filtering layer), the second drainage and irrigation channel 5, the second drainage and irrigation port 32 (the second filtering layer), the third drainage and irrigation channel 6 and the first drainage and irrigation port 2 (the first filtering layer), and then is discharged.

The drainage and irrigation channels are formed as follows. The third drainage and irrigation channel 6 having a square section is arranged in the multi-filtration auto-drainage/irrigation pipe 1 longitudinally along the pipe wall. A left lateral surface and a right lateral surface of the third drainage and irrigation channel 6 which is square are both closed surfaces. Above the third drainage and irrigation channel is the second drainage and irrigation port 32. Below the third drainage and irrigation channel is the first drainage and irrigation port 2. The two lateral surfaces of the third drainage and irrigation channel extend to connect to an inner wall of the pipe body for forming two extension surfaces, wherein the two extension surfaces are the third drainage and irrigation port. The first drainage and irrigation channel 4 is formed between a right side of the third drainage and irrigation port 31 and the inner wall of the pipe body. The second drainage and irrigation channel 5 is formed between a left side of the third drainage and irrigation port 31 and the inner wall of the pipe body.

A pore size of the first filtering holes is larger than a pore size of the second filtering holes; and the pore size of the second filtering holes is larger than a pore size of the third filtering holes.

The first, the second, and the third filtering holes are bar-shaped, triangular, circular, or square.

Second Embodiment

Assembly Structure

Referring to FIG. 1-5 of the drawings, the multi-filtration auto-drainage/irrigation pipe 1 is assembled by three components:

a pipe body 15 which is circular, wherein a pipe wall of the pipe body has an opening 13 thereon; two vertical plates 11 are respectively extended from two ends of the opening 13 into the multi-filtration auto-drainage/irrigation pipe; each end of the opening 13 has an arc groove 14; each top end of the vertical plates 11 has an arc flange; and an inner wall of the pipe body has two arc flanges 16;

a trapezoidal groove component 3, wherein the trapezoidal groove component has three surfaces: a bottom surface and two lateral slopes; a plurality of second filtering holes 34 are uniformly distributed on the bottom surface (a second drainage and irrigation port 32) of the trapezoidal groove component; a plurality of third filtering holes 33 are uniformly distributed on the two lateral slopes (a third drainage and irrigation port 31) of the trapezoidal groove component; each end of the bottom surface of the trapezoidal groove component has an arc groove 35; and each top end of the two lateral slopes of the trapezoidal groove component has an arc groove 36; and a bottom plate (a first drainage and irrigation port 2), wherein a plurality of first filtering holes 21 are uniformly distributed on the bottom plate and each side of the bottom plate has an arc flange 22.

The arc flanges and the arc grooves described above are arc-shaped, square or dovetail-shaped.

An assembly relationship is described as follows. The trapezoidal groove component 3 is provided on the vertical plates 11 in the pipe body 15 and the inner wall. The vertical plates 11 in the pipe body 15, the inner wall and the trapezoidal groove component 3 are plugged together through the two arc flanges of the vertical plates, the two arc flanges of the inner wall of the pipe body, the two arc grooves of the bottom surface of the trapezoidal groove component and the two arc grooves of the two lateral slopes of the trapezoidal groove component. The bottom plate is plugged into the opening 13 of the pipe wall of the pipe body 1. The opening of the pipe body 1 and the bottom plate are connected through the two arc grooves of the opening and the two arc flanges of the bottom plate.

After being assembled, the bottom plate is the first drainage and irrigation port as a first filtering layer; the bottom surface of the trapezoidal groove component is the second drainage and irrigation port as a second filtering layer; the two lateral slopes of the trapezoidal groove component are the third drainage and irrigation port as a third filtering layer; a third drainage and irrigation channel is formed between the bottom plate and the bottom surface of the trapezoidal groove component; a first drainage and irrigation channel is formed between the right lateral slope of the trapezoidal groove component and the inner wall of the pipe body; and a second drainage and irrigation channel is formed between the left lateral slope of the trapezoidal groove component and the inner wall of the pipe body.

Third Embodiment

Detailed Application of the Multi-Filtration Auto-Drainage/Irrigation Pipe 1 for a Flowerpot Referring to FIG. 6-11 of the drawings, a plating device of the present invention comprises:

a flowerpot 7;

a water supplying pipe 8 arranged in a planting container, wherein a water level mark is on the water supplying pipe;

the multi-filtration auto-drainage/irrigation pipe 1 vertically connected with the water supplying pipe 8; and a floating water level indicator 9 arranged in the water supplying pipe 8.

The water supplying pipe 8 has a plurality of sections, for satisfying different heights of the flowerpot. The sections of the water supplying pipe 8 are plugged together. A bottom of the water supplying pipe 8 is closed. At a lower part of the water supplying pipe 8, one or more layers of the multi-filtration auto-drainage/irrigation pipes 1 are arranged, wherein each layer has one or two multi-filtration auto-drainage/irrigation pipes (furcation form). A pipe joint (tee joint) for plugging is arranged between each multi-filtration auto-drainage/irrigation pipe 1 and a coupling end of the water supplying pipe 8. If the flowerpot is long and one multi-filtration auto-drainage/irrigation pipe 1 is not long enough, the multi-filtration auto-drainage/irrigation pipe 1 is able to be extended by connecting one more multi-filtration auto-drainage/irrigation pipes 1 through a joint or an elbow 20. Rubber sealing rings are arranged where each two sections of the water supplying pipe 8 are connected, where each multi-filtration auto-drainage/irrigation pipe 1 and the water supplying pipe 8 are connected and where each two multi-filtration auto-drainage/irrigation pipes 1 are connected. The floating water level indicator 9 is for indicating a height of a water level. Similarly, the planting device is also applied for a farmland efficient water-saving irrigation system, stereo planting, a box irrigation system and roof greening, a household workshop and desert greening cultivation.

Figure 13:
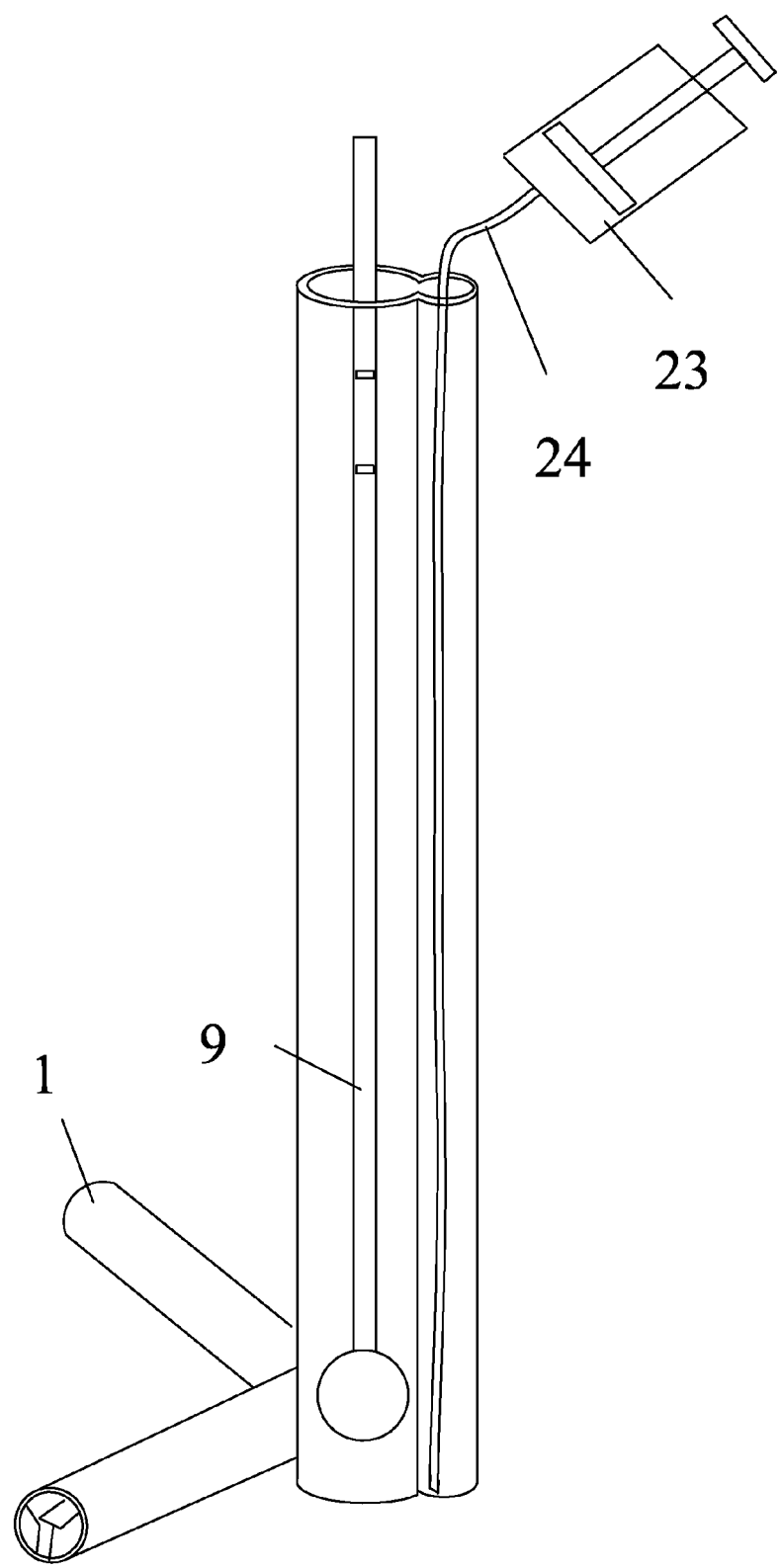
FIG. 13 is a sketch view of an alternative mode of the water supplying pipe of FIG. 6 according to the preferred embodiments of the present invention, wherein a conjoined attached pipe is arranged in the water supplying pipe.
Figure 14:
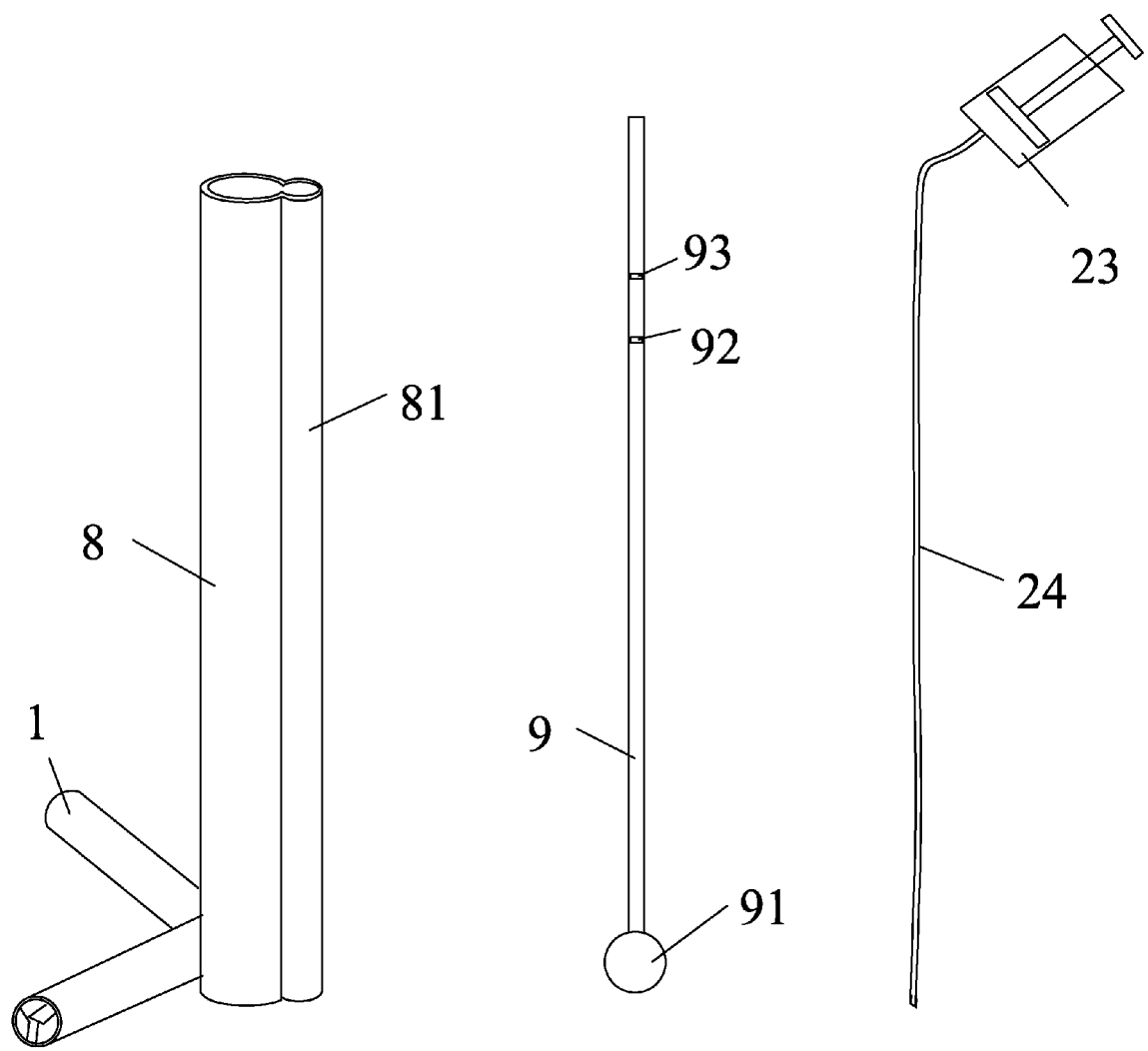
FIG. 14 is an exploded view of FIG. 13 according to the preferred embodiments of the present invention.

Referring to FIG. 13-14 of the drawings, an alternative mode of the water supplying pipe 8 is described. The water supplying pipe further comprises a conjoined attached pipe 81 which is intercommunicated with the water supplying pipe 8. A straw 24 is arranged in the conjoined attached pipe 8, wherein a top end of the straw 24 is connected with a water pumping device 23 (equivalent to a syringe) or a negative pressure balloon (not showed in the drawings).

The straw arranged in the conjoined attached pipe 81 is for suctioning or adding water and controlling matrix humidity; the straw is also for blowing air into the multi-filtration auto-drainage/irrigation pipe to dry the matrixes.

A pipe diameter of the multi-filtration auto-drainage/irrigation pipe 1 is determined by a hydraulic calculation according to a design of reversed seepage flow. A laying depth of the multi-filtration auto-drainage/irrigation pipe 1 in an asphalt surface or in a cement concrete road surface and in a permeable layer is required to prevent the multi-filtration auto-drainage/irrigation pipe 1 from being fractured by vehicles and construction machines. For new roads, a bottom of the multi-filtration auto-drainage/irrigation pipe 1 is required to be aligned with bottom surfaces of the asphalt surface or the cement concrete road surface and the permeable layer; for reconstructed roads, a center of the multi-filtration auto-drainage/irrigation pipe 1 is required to be lower than top surfaces of the asphalt surface or the cement concrete road surface and the permeable layer; and in a frost region, the center of the multi-filtration auto-drainage/irrigation pipe is further required to be lower than a local frost depth. Mountains, soil slopes and retaining walls are able to drain interior water through a manner of horizontal hole drainage; or through adopting the multi-filtration auto-drainage/irrigation pipe as a filtering drainage pipe, because the multi-filtration auto-drainage/irrigation pipe hardly blocks and has a high drainage volume.

The multi-filtration auto-drainage/irrigation pipe 1 is made of polyvinyl chloride (PVC) or poly ethylene (PE) or other materials (perspex materials).

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A multi-filtration auto-drainage/irrigation pipe having both a drainage function and an irrigation function, comprising:
    a pipe body component, wherein: said pipe body component comprises a pipe body and two vertical plates; said pipe body has an opening thereon; and, said two vertical plates are respectively extended from two ends of said opening towards an interior of said pipe body;
    a trapezoidal groove component, wherein: said trapezoidal groove component has a bottom surface and two lateral slopes; and, said trapezoidal groove component is connected with said two vertical plates and an inner wall of said pipe body; and
    a bottom plate, wherein: said bottom plate is connected with said two ends of said opening of said pipe body; and said bottom plate is opposite to said bottom surface of said trapezoidal groove component;
    wherein:
    said two vertical plates, said two lateral slopes of said trapezoidal groove component and said inner wall of said pipe body form two first drainage and irrigation channels, respectively;
    said trapezoidal groove component and said inner wall of said pipe body form a second drainage and irrigation channel;
    said two vertical plates, said bottom surface of said trapezoidal groove component and said bottom plate form a third drainage and irrigation channel;
    first filtering holes are uniformly distributed on said bottom plate; and, said bottom plate forms a first drainage and irrigation port as a first filtering layer on a pipe wall of said pipe body;
    second filtering holes are uniformly distributed on said bottom surface of said trapezoidal groove component; said bottom surface of said trapezoidal groove component forms a second drainage and irrigation port as a second filtering layer; and said second drainage and irrigation port is arranged between said third drainage and irrigation channel and said second drainage and irrigation channel;
    third filtering holes are uniformly distributed on said lateral slopes of said trapezoidal groove component; said two lateral slopes of said trapezoidal groove component form third drainage and irrigation ports as third filtering layers; and said third drainage and irrigation ports are respectively arranged between said second drainage and irrigation channel and said first drainage and irrigation channels;
    when draining, water flows successively through said first filtering layer, said second filtering layer, said third filtering layers and said first drainage and irrigation channels, and then is discharged; and
    when irrigating, the water flows successively through said first drainage and irrigation channels, said third filtering layers, said second filtering layer and said first filtering layer, and then is discharged.

2. The multi-filtration auto-drainage/irrigation pipe, as recited in claim 1, wherein:
    said pipe body is circular; and said third drainage and irrigation channel has a square section;
    said third drainage and irrigation channel is intercommunicated with said second drainage and irrigation channel through said second filtering holes on said second drainage and irrigation port;
    said first drainage and irrigation channels are intercommunicated with said second drainage and irrigation channel through said third filtering holes on said third drainage and irrigation ports; and
    said two vertical plates as two lateral surfaces of said third drainage and irrigation channel are both closed surfaces; said third drainage and irrigation channel is respectively separated from said first drainage and irrigation channels through said closed surfaces; and, said two lateral surfaces of said third drainage and irrigation channel extend to connect to said inner wall of said pipe body for forming two extension surfaces which are said two lateral slopes of said trapezoidal groove component and serve as said third drainage and irrigation ports.

3. The multi-filtration auto-drainage/irrigation pipe, as recited in claim 2, wherein:
    each end of said opening of said pipe body has an arc groove;
    each top end of said two vertical plates arranged in said pipe body has an arc flange;
    said inner wall of said pipe body has two arc flanges;
    each side of said bottom plate has an arc flange;
    each end of said bottom surface of said trapezoidal groove component has an arc groove;
    each top end of said two lateral slopes of said trapezoidal groove component has an arc groove;
    said bottom plate is plugged into said opening of said pipe body through said arc grooves and said arc flanges; and
    said vertical plates arranged in said pipe body, said inner wall of said pipe body and said trapezoidal groove component are plugged together through said arc flanges and said arc grooves.

4. The multi-filtration auto-drainage/irrigation pipe, as recited in claim 2, wherein a pore size of said first filtering holes is larger than a pore size of said second filtering holes; and said pore size of said second filtering holes is larger than a pore size of said third filtering holes.

5. The multi-filtration auto-drainage/irrigation pipe, as recited in claim 2, wherein said first, said second and said third filtering holes are bar-shaped, triangular, circular or square.

6. The multi-filtration auto-drainage/irrigation pipe, as recited in claim 1, wherein:
    each end of said opening of said pipe body has an arc groove;
    each top end of said two vertical plates arranged in said pipe body has an arc flange;
    said inner wall of said pipe body has two arc flanges;
    each side of said bottom plate has an arc flange;
    each end of said bottom surface of said trapezoidal groove component has an arc groove;
    each top end of said two lateral slopes of said trapezoidal groove component has an arc groove;
    said bottom plate is plugged into said opening of said pipe body through said arc grooves and said arc flanges; and said vertical plates arranged in said pipe body, said inner wall of said pipe body and said trapezoidal groove component are plugged together through said arc flanges and said arc grooves.

7. The multi-filtration auto-drainage/irrigation pipe, as recited in claim 1, wherein a pore size of said first filtering holes is larger than a pore size of said second filtering holes; and said pore size of said second filtering holes is larger than a pore size of said third filtering holes.

8. The multi-filtration auto-drainage/irrigation pipe, as recited in claim 1, wherein said first, said second and said third filtering holes are bar-shaped, triangular, circular or square.

9. The multi-filtration auto-drainage/irrigation pipe, as recited in claim 1, wherein:
- an upper part of the multi-filtration auto-drainage/irrigation pipe is arc-shaped;
- a lower part of the multi-filtration auto-drainage/irrigation pipe is square; and
- said bottom plate is arc-shaped or flat.

10. A planting device, comprising:
- a planting container;
- a water supplying pipe arranged in said planting container;
- a floating water level indicator arranged in said water supplying pipe, wherein: said floating water level indicator is for indicating a height of a water level; a highest water level mark and a lowest water level mark are on said floating water level indicator, and a bottom end of said floating water level indicator is connected with a buoy which floats on water in said water supplying pipe; and
- a multi-filtration auto-drainage/irrigation pipe vertically connected with said water supplying pipe, comprising a pipe body component, a trapezoidal groove component and a bottom plate, wherein:
- said pipe body component comprises a pipe body and two vertical plates; said pipe body has an opening thereon; and, said two vertical plates are respectively extended from two ends of said opening towards an interior of said pipe body;
- said trapezoidal groove component has a bottom surface and two lateral slopes; and, said trapezoidal groove component is connected with said two vertical plates and an inner wall of said pipe body;
- said bottom plate is connected with said two ends of said opening of said pipe body; and said bottom plate is opposite to said bottom surface of said trapezoidal groove component;
- said two vertical plates, said two lateral slopes of said trapezoidal groove component and said inner wall of said pipe body form two first drainage and irrigation channels, respectively;
- said trapezoidal groove component and said inner wall of said pipe body form a second drainage and irrigation channel;
- said two vertical plates, said bottom surface of said trapezoidal groove component and said bottom plate form a third drainage and irrigation channel;
- first filtering holes are uniformly distributed on said bottom plate; and, said bottom plate forms a first drainage and irrigation port as a first filtering layer on a pipe wall of said pipe body;
- second filtering holes are uniformly distributed on said bottom surface of said trapezoidal groove component; said bottom surface of said trapezoidal groove component forms a second drainage and irrigation port as a second filtering layer; and said second drainage and irrigation port is arranged between said third drainage and irrigation channel and said second drainage and irrigation channel;
- third filtering holes are uniformly distributed on said lateral slopes of said trapezoidal groove component; said two lateral slopes of said trapezoidal groove component form third drainage and irrigation ports as third filtering layers; and said third drainage and irrigation ports are respectively arranged between said second drainage and irrigation channel and said first drainage and irrigation channels;
- when draining, water flows successively through said first filtering layer, said second filtering layer, said third filtering layers and said first drainage and irrigation channels, and then is discharged; and
- when irrigating, the water flows successively through said first drainage and irrigation channels, said third filtering layers, said second filtering layer and said first filtering layer, and then is discharged.

11. The planting device, as recited in claim 10, wherein:
- said water supplying pipe has a plurality of sections which are same and vertically plugged together; and, an amount of said sections of said water supplying pipe is adjustable for satisfying different heights of said planting container;
- said multi-filtration auto-drainage/irrigation pipe is arranged on at least one section of said water supplying pipe;
- on each section of said water supplying pipe, at most two multi-filtration auto-drainage/irrigation pipes are arranged;
- a pipe joint for plugging is arranged between each multi-filtration auto-drainage/irrigation pipe and a coupling end of said water supplying pipe; and
- said multi-filtration auto-drainage/irrigation pipe is able to be extended by connecting one more multi-filtration auto-drainage/irrigation pipe through a joint or an elbow.

12. The planting device, as recited in claim 11, wherein:
- said water supplying pipe further comprises a conjoined attached pipe which is intercommunicated with said water supplying pipe;
- a straw device is arranged in said conjoined attached pipe; and
- said straw device comprises a straw, wherein a top end of said straw is connected with a water pumping device or a negative pressure balloon.

13. The planting device, as recited in claim 10, wherein:
- said water supplying pipe further comprises a conjoined attached pipe which is intercommunicated with said water supplying pipe;
- a straw device is arranged in said conjoined attached pipe; and
- said straw device comprises a straw, wherein a top end of said straw is connected with a water pumping device or a negative pressure balloon.

* * * * *